US010458085B2

(12) United States Patent
Appelboom et al.

(10) Patent No.: US 10,458,085 B2
(45) Date of Patent: Oct. 29, 2019

(54) AUTOMATIC WATER CONTROL SYSTEM FOR OPEN DITCH DRAINAGE

(71) Applicant: Custom Water Management Solutions, LLC, Cary, NC (US)

(72) Inventors: Timothy William Appelboom, Cary, NC (US); Chad Poole, Bellhaven, NC (US); Mohamed Abdelmoneim Youssef, Cary, NC (US); George M. Chescheir, Chapel Hill, NC (US); Richard Wayne Skaggs, Raleigh, NC (US)

(73) Assignee: Custom Water Management Solutions, LLC, Cary, NC (US)

( * ) Notice: Subject to any disclaimer, the term of this patent is extended or adjusted under 35 U.S.C. 154(b) by 0 days.

(21) Appl. No.: 15/376,869

(22) Filed: Dec. 13, 2016

(65) Prior Publication Data
US 2017/0089022 A1 Mar. 30, 2017

Related U.S. Application Data

(63) Continuation of application No. 14/739,007, filed on Jun. 15, 2015, now Pat. No. 9,537,183.

(60) Provisional application No. 62/012,451, filed on Jun. 16, 2014.

(51) Int. Cl.
| | | |
|---|---|---|
| E02B 7/20 | (2006.01) | |
| E02B 7/28 | (2006.01) | |
| E02B 7/36 | (2006.01) | |
| H01M 10/46 | (2006.01) | |
| H02S 40/38 | (2014.01) | |
| E02B 11/00 | (2006.01) | |

(52) U.S. Cl.
CPC ............... *E02B 7/205* (2013.01); *E02B 7/28* (2013.01); *E02B 7/36* (2013.01); *E02B 11/00* (2013.01); *H01M 10/465* (2013.01); *H02S 40/38* (2014.12)

(58) Field of Classification Search
CPC combination set(s) only.
See application file for complete search history.

(56) References Cited

U.S. PATENT DOCUMENTS

| | | | | |
|---|---|---|---|---|
| 4,922,433 A | * | 5/1990 | Mark ...................... | E02B 13/00 137/624.2 |
| 8,591,147 B2 | * | 11/2013 | Quigley ................... | E03F 1/00 137/236.1 |
| 2002/0066484 A1 | * | 6/2002 | Stringam ................ | A01G 25/16 137/392 |
| 2005/0129463 A1 | * | 6/2005 | Craig ...................... | E02B 13/02 405/99 |
| 2008/0253837 A1 | * | 10/2008 | Miller ...................... | E02B 9/02 405/80 |

\* cited by examiner

*Primary Examiner* — Kyle Armstrong
(74) *Attorney, Agent, or Firm* — Coats & Bennett PLLC

(57) ABSTRACT

An automatic water control system for open ditch drainage includes a drainage control apparatus that is designed to be disposed in a drainage ditch and to control the water level in the drainage ditch, as well as the water table level in the field.

8 Claims, 7 Drawing Sheets

AUTOMATIC WATER CONTROL SYSTEM FOR OPEN DITCH DRAINAGE

The present application is a continuation of U.S. patent application Ser. No. 14/739,007 filed Jun. 15, 2015, which claims priority to U.S. Provisional Patent Application Ser. No. 62/012,451 filed on Jun. 16, 2014. These applications are incorporated in their entirety by reference herein.

FIELD OF THE INVENTION

The present invention relates to open ditch drainage systems for fields and more particularly to automatic controls for controlling open ditch drainage.

BACKGROUND OF THE INVENTION

Currently, drainage is required on approximately 110 million acres of agricultural lands in the United States. Of this approximately 41 million acres are drained using subsurface drain tubes, 36 million acres using open ditches, and 33 million acres using other surface drainage methods. Agricultural drainage lowers the water table allowing crops to be grown on soils normally too wet for crop production due to excessive soil water conditions and inability to perform planting, harvesting or other field operations.

Conventional drainage, also referred to as free drainage, maximizes drainage by lowering water level at the drainage outlet to a depth greater than 3 feet from the soil surface throughout the year. A drawback to this practice is that it removes water even during drought conditions resulting in crop yield reduction or loss due to drought stress or increased irrigation demands. Also nutrients from the fields are lost with the drainage water to streams, rivers, lakes, and estuaries.

As a solution to this drawback, flash board risers are installed at the drainage outlet. This practice is known as controlled drainage or water table management. Control structures have individual boards that can be installed, giving the ability to raise or lower the water level to a desired depth below the soil surface. Typically the water level is kept higher (just below the root zone) during the growing season to supply water to the crops, lowered during planting and harvest operations, then raised close to the soil surface during the fallow period (winter) to reduce water and nutrient loss from the field when no crop is growing. The major drawbacks to this system are the time and effort it takes to remove or replace the boards, and leakage around the joints in the boards resulting in poor drainage control. The boards often swell and become stuck in the track of the control structure which results in the need to cut the boards out when it is time to lower the water table. This costs the farmer money when the boards need to be replaced to raise the water table again. Also there is a safety issue in removing the boards. Pressure of the upstream water on the boards may cause them to suddenly break as they are being cut possibly resulting in injury.

The system described herein overcomes the drawbacks of the previously used structures. The system replaces the wooden boards with an automated gate valve which greatly simplifies lowering the water level behind the structure. The proposed automation will free the farmer from the need to manage the day to day operation of the structure for both drainage and irrigation and improve farm safety.

SUMMARY OF THE INVENTION

The present invention relates to an apparatus or system for controlling the flow of water from a drainage ditch. The apparatus comprises a frame structure disposed in the drainage ditch. A controllable gate valve is incorporated into the apparatus and moveable between open and closed positions. When the gate valve is in an open position, water in the drainage ditch is permitted to flow through an opening in the apparatus into a downstream outlet pipe or conduit. The gate valve can be controlled by various means. In one embodiment, the gate valve is manually controlled. In another embodiment, the gate valve is manually actuated but electronically driven. In a third embodiment, the gate valve is automatically actuated and controlled by a programmable controller. To prevent leakage past the gate valve when closed, there is provided a seal structure that generally surrounds the gate valve when in the closed position. In addition, in one embodiment, the gate valve includes a moveable plate that opens and closes a through opening in the apparatus. Formed about the lower edge of the plate is a beveled cutting edge which cuts through trash and debris that might lie in the valve opening when the gate valve is closed.

In one embodiment, the present invention comprises a drainage control apparatus that is designed to be placed in a drainage ditch adjacent a field where the drainage control apparatus controls the level of water in the drainage ditch. The apparatus comprises a frame structure and a weir plate supported by the frame structure and adapted to extend across at least a portion of the drainage ditch. An opening formed in the weir plate permits water to flow through the opening. A pair of spaced apart vertical guide rails is supported directly or indirectly by the weir plate in the vicinity of the opening in the weir plate. A gate including side edges, a front and a back is moveably mounted in the vertical guide rails adjacent the opening of the weir plate and moveable between open and closed positions for opening and closing the opening in the weir plate. An elongated vertical seal is disposed generally between each side edge of the gate and an adjacent vertical guide rail. A transverse seal is secured across the back of the gate for preventing water from flowing through the opening in the weir plate and past the transverse seal when the gate assumes the closed position.

The present invention also includes a control system for controlling moisture conditions in a field adjacent a drainage ditch. This control system comprises a drainage control apparatus that is designed to be disposed in the drainage ditch. The apparatus includes a weir plate having a drainage opening and a gate moveably mounted adjacent the drainage opening for opening and closing the drainage opening. An actuator is provided for moving the gate between open and closed positions. A controller is operatively connected to the actuator for controlling the actuator and the movement of the gate. The controller includes inputs for receiving signals representative of the water table level in the field and the water level in the ditch. The controller is configured to control the actuator and the movement of the gate based on the signals received by the controller which are representative of the water table level in the field and/or the water level in the drainage ditch.

Other objects and advantages of the present invention will become apparent and obvious from a study of the following description and the accompanying drawings which are merely illustrative of such invention.

DESCRIPTION OF EXEMPLARY
EMBODIMENTS OF THE INVENTION

Figure 1:
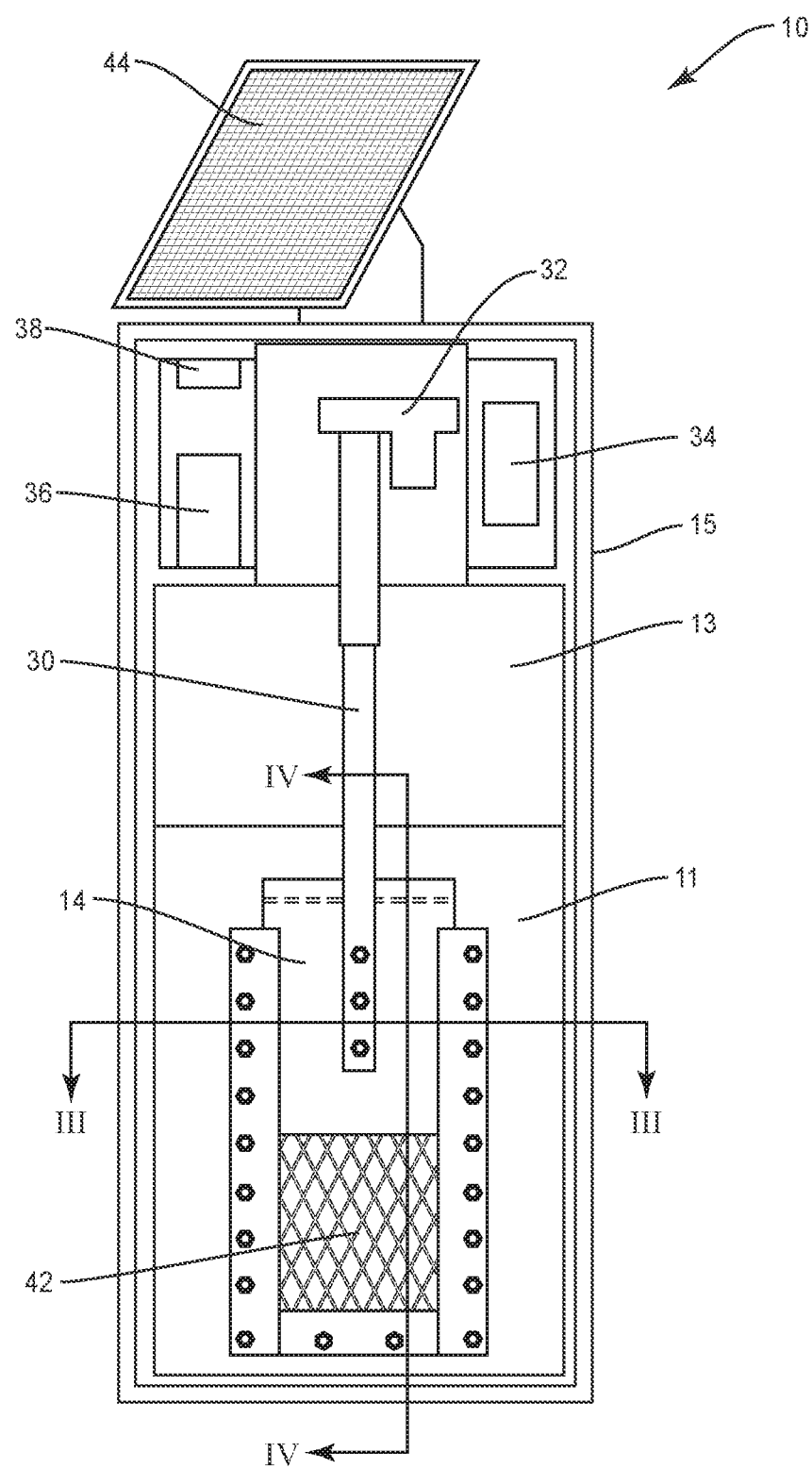
FIG. 1 is an elevational view of a drainage control apparatus designed to be disposed in a drainage ditch.

With further reference to the drawings, the present invention includes a drainage control apparatus indicated generally by the numeral 10. See FIG. 1. As will be apparent from the following discussion, the drainage control apparatus 10 is designed to be implemented in an open drainage ditch that is typically disposed adjacent a field where the drainage ditch is utilized to control the height or elevation of the water table throughout the field. As seen in FIG. 1, the drainage control apparatus 10 includes a frame structure. For purposes of reference, the frame structure includes a front and back with the front facing upstream in the drainage ditch and the back facing downstream with respect to the drainage ditch. Mounted in the frame structure is a gate valve that is utilized to control the flow of water through the drainage control apparatus 10. The gate valve is moveable between a fully open position and a closed position. In addition, the gate valve can be disposed in partial open positions. When the gate valve is open, water in the drainage ditch is permitted to flow therethrough and to enter a main outlet pipe that is disposed adjacent the rear portion of the drainage control apparatus 10. It follows that when the gate is closed, no water is permitted to flow through the same and a substantial portion of the drainage control apparatus 10 forms a dam that generally retains the water upstream of the drainage control device.

Turning to a more detailed discussion of the apparatus or control system, reference is made to FIGS. 1-4. A weir plate 11 is secured to the front of the apparatus 10 and supported directly or indirectly by the frame structure 15. Weir plate 11 includes an opening or orifice 11A that permits water to flow through a portion thereof. It is appreciated that there is an opening 13 above the upper edge of the weir plate 11. This enables water to flow over the upper edge of the weir plate 11 and into the drainage pipe when the water level in the drainage ditch exceeds the height of the upper edge of the weir plate.

Figure 4:
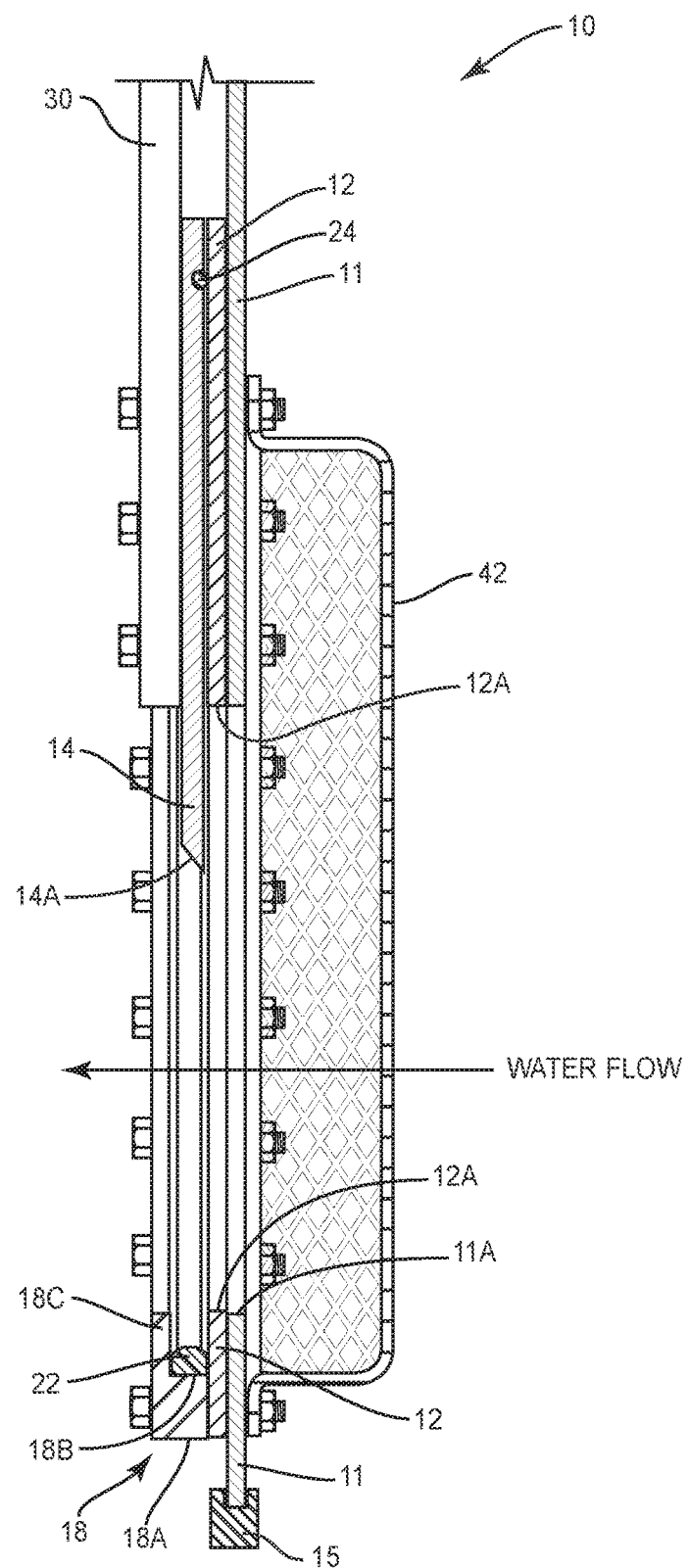
FIG. 4 is a partial sectional view taken through the line V-V of FIG. 1.

In one exemplary design, mounted to the weir plate 11 is a mounting plate 12. Mounting plate 12 is secured to the weir plate 11 and includes an opening 12A that aligns with the opening or orifice 11A in the weir plate. A gate or gate valve 14 is moveably mounted on the back side of the mounting plate 12. Gate 14 is moveable between a closed position and an open position. When in the closed position, gate 14 effectively closes the opening 12A and the mounting plate and it follows that this closes the opening 11A in the weir plate. In the open position, gate 14 is elevated and thereby provides an opening through both the mounting plate 12 and the weir plate 11. Again, in this open position, whether the gate be partially open or fully open, water from the upstream side of the apparatus 10 is permitted to flow through the apparatus into the outlet pipe or conduit that extends downstream from the apparatus. The lower edge of gate 14 is formed into a knife or cutting edge 14A. As seen in FIG. 4, the knife edge, in one embodiment, is beveled at approximately a 45° angle. This allows gate 14 to effectively cut through trash and debris that might underlie the gate when the gate is being closed.

Gate 14 is generally retained about the mounting plate 12 by a pair of laterally spaced apart vertical guide rails 16. Guide rails 16 are bolted to the mounting plate 12. As particularly seen in FIG. 3, each vertical guide rail 16 includes a main body 16A and an integral finger 16B projecting inwardly from the main body. Note in FIG. 3 where each guide rail 16A is bolted to both the mounting plate 12 and the weir plate 11. Fingers 16B are spaced from the mounting plate 12 so as to define an opening or cavity that extends the length of the guide rails 16. The space formed by the opening is dimensioned to appropriately receive a side edge portion of the gate 14. In other words, the spacing is such that the gate 14 is permitted to slide up and down between the fingers 16B and the mounting plate 12.

Figure 2:
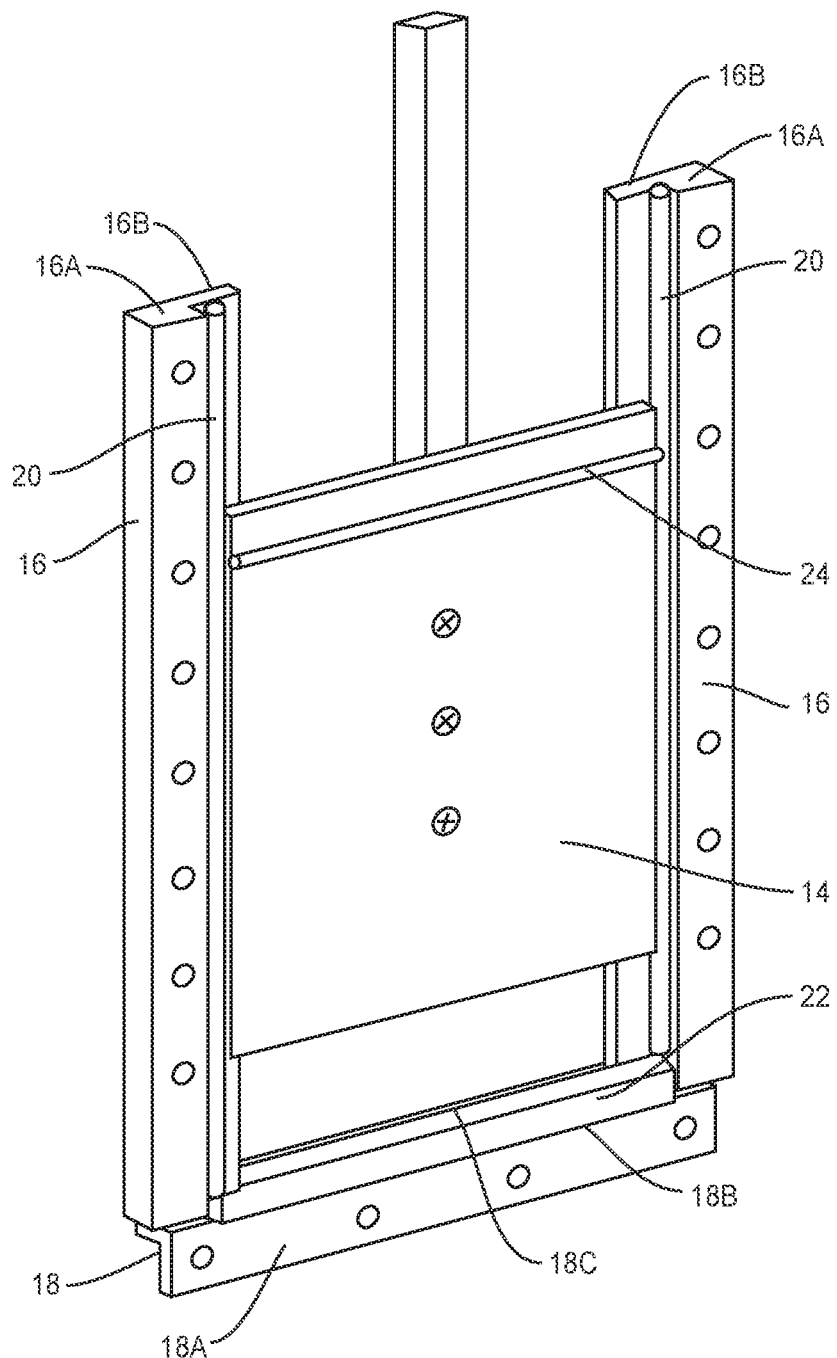
FIG. 2 is a fragmentary perspective view showing a gate that is designed to open and close a drainage opening in the apparatus shown in FIG. 1.
Figure 3:
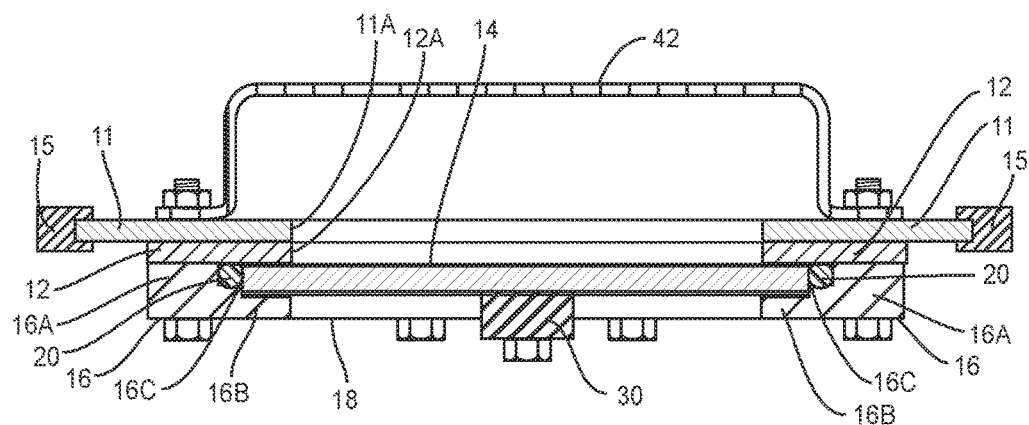
FIG. 3 is a cross-sectional view taken through the line III-III of FIG. 1.
Figure 3A:
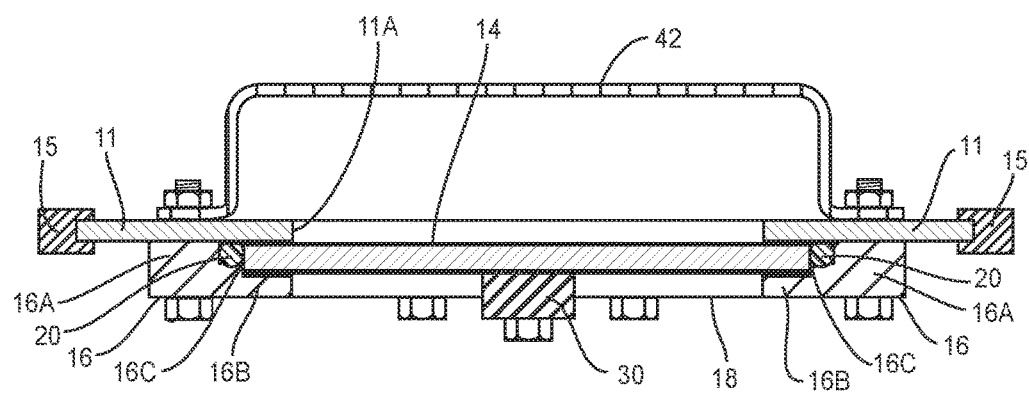
FIG. 3A is a view similar to FIG. 3 but shows an alternative embodiment of the drainage control apparatus.

As will be discussed herein, one feature of the present invention entails a gate design that provides a simple and efficient sealing structure to prohibit water from leaking around the gate 14 when the gate is closed. Thus, as seen in FIGS. 2-4, there is provided a pair of vertical seals 20. Each seal 20 is disposed in the opening formed between a finger 16B and the adjacent mounting plate 12. Note further, where the seal 20 abuts with an outer edge of the gate 14. Thus, each seal 20 is surrounded by a side edge of the gate 14, a portion of the finger 16B, a portion of the main body 16A, and the mounting plate 12. This provides an efficient seal that prohibits or substantially minimizes water leakage past the outer sides of the gate 14. See FIGS. 2-3. As seen in FIGS. 3 and 3A, the seal 20 is partially surrounded by the main body 16A of the guide rail structure 16. The main body 16A includes a spur 16C that tends to clamp the seal 20 in place. See FIGS. 3 and 3A.

Secured transversely across the backside of the mounting plate 12 adjacent the lower edge of the opening in the mounting plate is a bottom plate 18. Bottom plate 18, as seen in FIG. 2, includes a fastening section 18A that is attached directly to the mounting plate 12. Extending from an upper portion of the fastening section 18A is a ledge 18B. Extending upwardly from the ledge 18B and spaced from the mounting plate is a transverse retainer 18C. See FIG. 4. A bottom seal 22 is supported on the ledge 18B. See FIG. 4 where the bottom seal 22 is surrounded by a portion of the mounting plate 12, ledge 18B and retainer 18C. Thus, seal 22 forms an interface between the tapered cutting edge 14A of the gate 14 and the bottom plate 18.

Gate 14 is also provided with a transverse seal. As seen in FIGS. 2-4, there is provided a transverse groove across the front face of the gate 14. Secured in this groove is a seal 24 that engages the back surface of the mounting plate 12 above the opening 12A in the mounting plate.

The embodiment of the apparatus 10, shown in FIGS. 1-3, employs the mounting plate 12 between the weir 11 and the guide rails 16 and lower member 18. However, in some situations, the mounting plate 12 is not required. An example of this design is shown in FIG. 3A. Note that the vertical guide rails 16 and the lower support member 18 are secured directly to the weir plate 11. This means, of course, that the seal 24 disposed on the front side of the gate 14 engages a back side of the weir plate 11 as the gate 14 moves up and down. Otherwise, the function and structure of the control apparatus shown in FIG. 3A is the same as that discussed with the embodiment shown in FIGS. 1-3.

Gate 14 is provided with means for raising and lowering the same. In one embodiment, this means is referred to as a connecting shaft 30. In one embodiment, the gate 14 can be manually actuated and controlled. Gate 14 can be set or stationed in a fully open position or in partially open positions.

In another embodiment, the apparatus provided herein provides for automatically controlling the gate 14. This is accomplished by utilizing a conventional linear actuator 32 or other electric actuating device. Linear actuator 32 is operatively connected to the connecting shaft 30. Actuation of the linear actuator 32 causes the gate 14 to be moved up or down and again the linear actuator can be controlled such that the gate can be positioned in partially open positions. Linear actuator 32 is controlled by a programmable controller 34 that will be discussed subsequently. A battery 36 is provided for powering the controller 34 and the linear actuator 32. Also, it is seen in the drawings where the drainage control apparatus 10 is provided with a solar collector 44. Solar collector 44 is operatively connected to the battery for recharging or maintaining a charge on the same. A voltage regulator 38 is operatively connected between the solar collector 44 and the battery 36. Voltage regulator 38 controls the voltage applied to the battery.

As shown in the drawings, the apparatus 10 is provided with a wire cage 42 on the front side of the openings in the mounting plate 12 and weir plate 11. This serves two functions. First, the weir cage 42 prohibits large debris and other objects from entering the area around the gate 14 and the openings formed in the mounting plate 12 and weir plate 11. This prevents such debris and trash from clogging these openings. In addition, the wire cage 42 serves as a safety shield.

Figure 5:
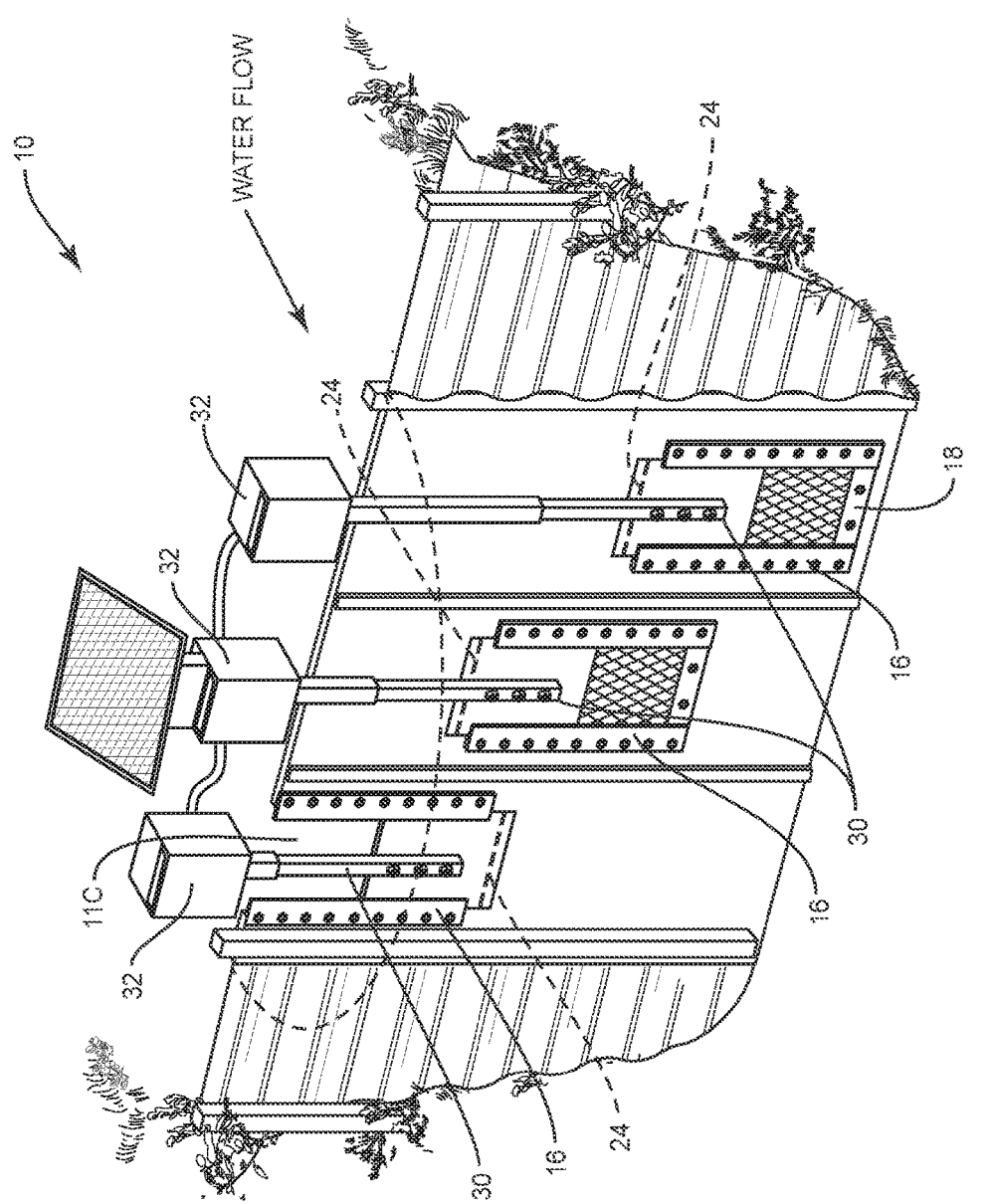
FIG. 5 is a fragmentary view showing a version of the drainage control apparatus disposed in a drainage ditch.

The gate 14, discussed above and shown in FIGS. 1-3, is what is referred to as a bottom open version. That is, the gate opens from the bottom. There is a second version. In this version, the gate 14 is a top open version and opens downwardly and closes by raising up. The structure and operation of this version is very similar to what has been described and discussed above. There are a few differences. FIG. 5 shows a drainage control apparatus that includes three gates. The gate and weir opening on the extreme left hand side is an example of this second version of a gate which closes by raising. The gate is mounted adjacent the back side of the weir plate 11. There is no mounting plate 12 in this design. A rectangular or square opening 11C is cut in an intermediate or upper portion of the weir 11. This forms the opening through which water flows when the gate 14 is open. Like the design shown in FIGS. 3 and 4, the gate 14 is confined by guiderails 16. The same type of seal structure is provided to prevent water from flowing past the gate 14 when the gate is in the closed position. That is, there are vertical seals 20 associated with the guiderails 16 and a transverse seal 24 disposed about a lower portion of the gate 14 in a groove formed therein. As seen in FIG. 5, the gate 14 (the left extreme gate) assumes a closed position when disposed in an upper position. The upper edge of the gate 14 generally aligns with the upper edge of the weir 11. To open the gate, the gate 14 is actuated and pushed downwardly so as to expose the open area formed in the weir 11. The same type of controls discussed above with respect to the version shown in FIGS. 1-3 can be utilized to drive and control this version of the gate. That is, the connecting structure 30 connected to the gate 14 can be operatively connected to a linear actuator 32 that actuates or moves the gate 14 up and down.

Continuing to refer to FIG. 5, the drainage control apparatus 10 as envisioned here includes three gates 14 and three separate openings in one or more weir plates disposed in the drainage ditch. Note that the openings in the weir plate or plates are staggered. The leftmost opening 11C, as just discussed, is formed in an upper portion of the weir plate. The center opening in the weir plate is disposed at an intermediate level while the rightmost opening is disposed in a lower portion of the weir plate. The two gates 14 disposed on the right side are of the type shown in FIGS. 1-3 and accordingly they move down to close the openings in the weir plate. The gate disposed on the upper left side, as discussed above, is of the type that requires the gate to move upwardly in order to close the opening in the weir plate. Here a single solar collector 44 is sufficient to charge the batteries that are employed to power the three actuators 32. It is appreciated that the drainage control apparatus 10, shown in FIG. 5, is oriented in the drainage ditch such that the upstream direction is upwardly and to the right of the control apparatus and the downstream direction is to the lower left as viewed in FIG. 5. This, of course, means that water flows from the upper right to the lower left as viewed in FIG. 5. Not shown in FIG. 5 is an outlet conduit that is typically formed adjacent the downstream side of the drainage control apparatus 10.

Controller 34 can be pre-programmed to control the gate or gates 14 based on preset dates and/or environmental factors. The electronic programmable controller operates the linear actuator 32. It is operated on a real-time clock and calendar. Opening of the gate valve 14 can be based on cooperative extension recommendations for crop planting and harvesting time or based on selected planting and harvesting times. Generally, planting and harvesting dates are recommended for each particular crop. These dates are entered into the controller as times to open the gate valve 14 and drain water from the drainage ditches and the fields, drying them to a point that planting or harvesting equipment can easily enter and operate in the fields. Based on a selected time, for example two weeks after opening the gate valve, the controller is programmed to close the gate valve 14 so that water level in the drainage ditches and the associated fields' water tables rise to a selected or desired level. The timing of raising and lowering the water levels in the associated ditches can be customized for different crops to suit the goals of individual growers.

In one embodiment, the controller 34 is provided with an override capability. That is, an operator can override the controller 34 which allows the farmer to manually activate the linear actuator 32 whenever it is required. For example, if the farmer desires to plant or harvest early, or has to plant or harvest due to inclement weather, the farmer can drain the fields with the push of a button prior to planting or harvest. Also, after planting or harvesting, the water levels can be brought back up with the push of a button. If a sudden storm occurs and excess water needs to be removed from the fields, the farmer can quickly open the gate valve 14 with the press of a button, allowing the farmer to quickly drain excess water from associated or adjacent fields. When the water level returns to the desired level, the farmer simply closes the gate valve 14.

Figure 6:
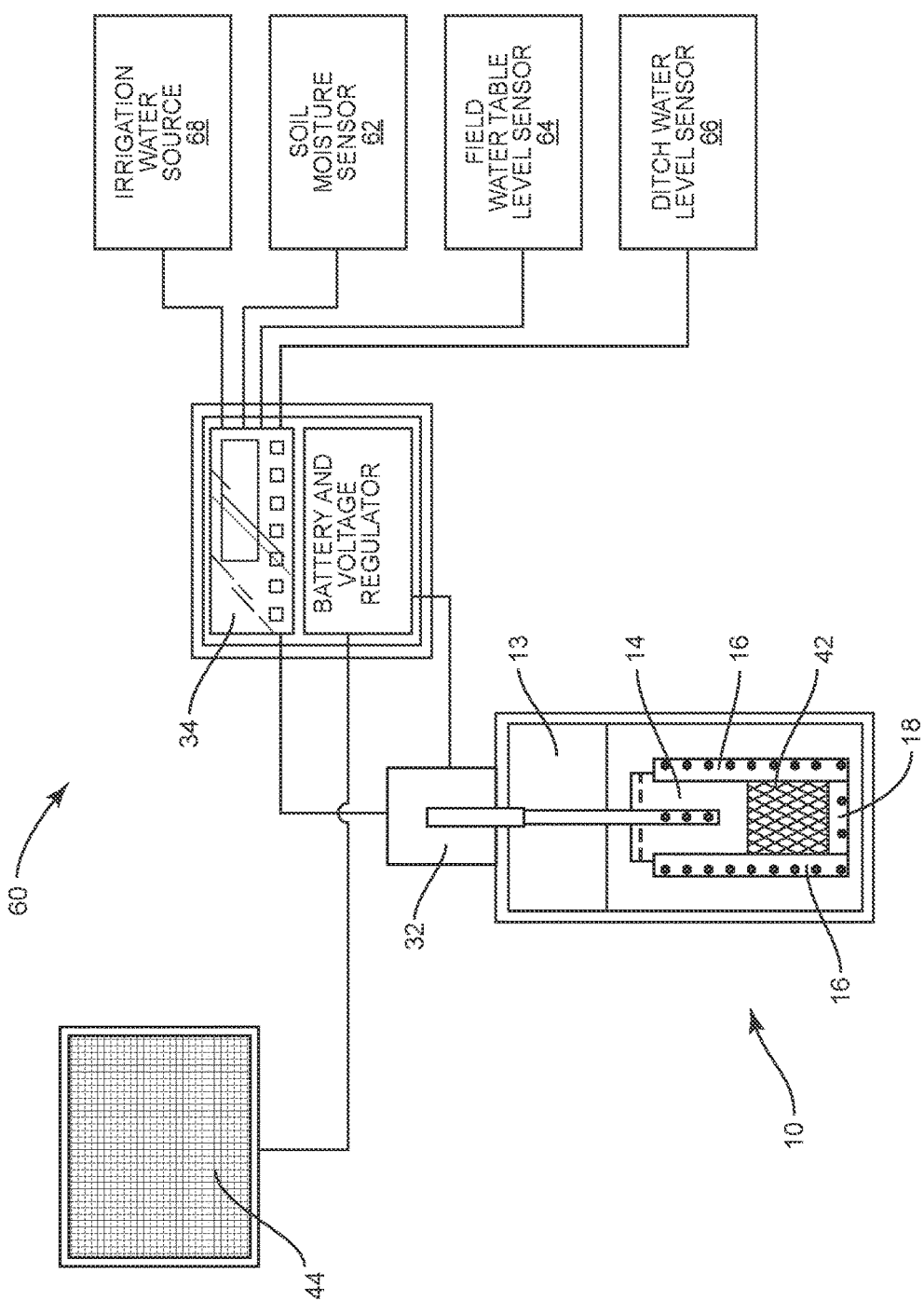
FIG. 6 is a schematic illustration of a control system for controlling moisture conditions in a field.

With reference to FIG. 6, there is shown therein a control system indicated generally by the numeral 60. Control system 60 controls the drainage control apparatus 10 referred to above that controls the flow of water from the drainage ditch into the discharge conduit that is located downstream from the apparatus 10. Control system 60 includes many of the same elements discussed above. For example, the same includes the controller 34, the solar collector 44 and the drainage control apparatus 10. In addition, control system 60 includes a soil moisture sensor 62 that is typically disposed in the field to measure water content in the crop root zone. There is also provided a field water table sensor 64 that is in the form of a pressure transducer that is operative to measure the water table level in the field. There is a ditch water level sensor 66 that includes a transducer configured to measure the water level in the drainage ditch in front of the drainage control apparatus 10. All three of these sensors are operatively connected to the controller 34. Control system 60 is operatively connected to an irrigation water source 68. The irrigation water source 68 is designed to pump water into the drainage ditch. Data and information sensed by the sensors 62, 64 and 66 are directed to the controller via inputs and, based on pre-programmed logic, the controller is operative to control apparatus 10 and the flow of water therethrough and activate and deactivate the irrigation water source 68.

Figure 7:
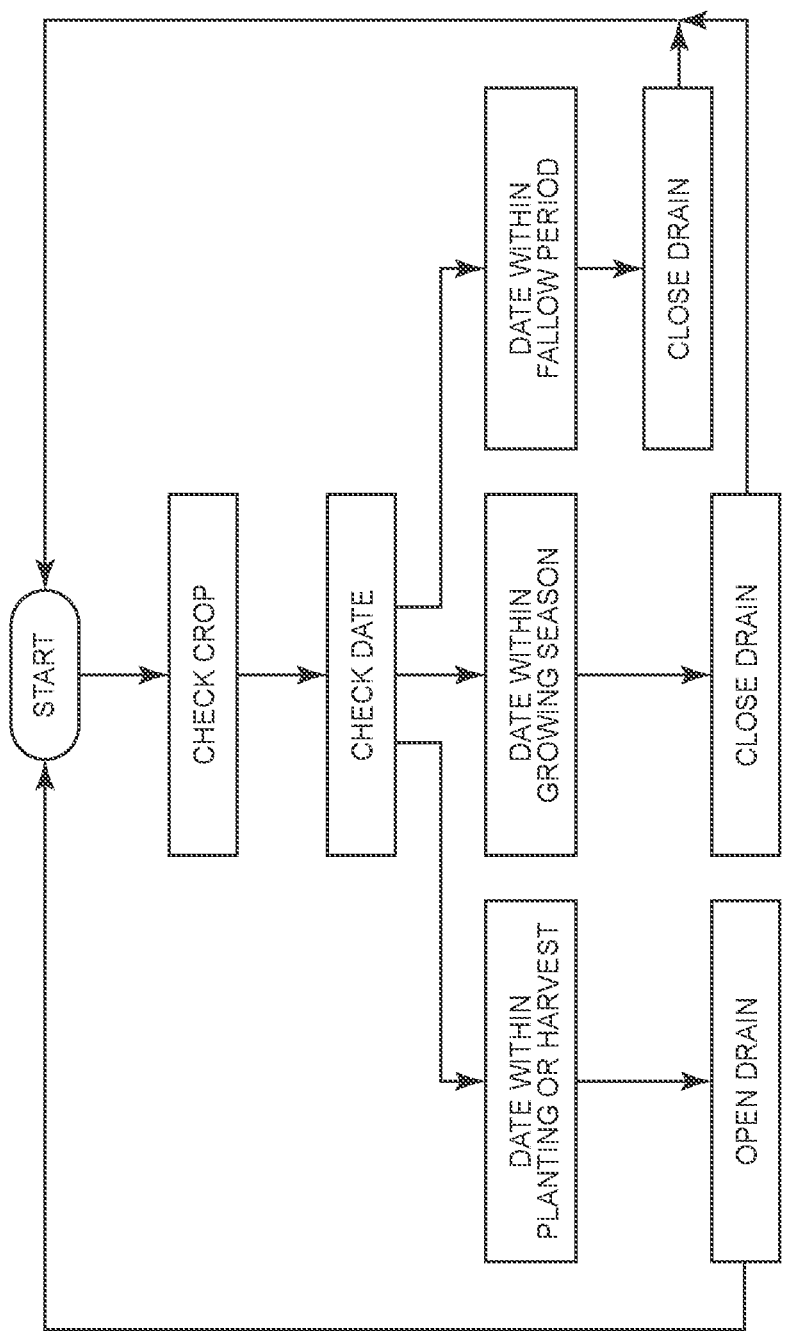
FIG. 7 is an exemplary logic control schematic that can be programmed into the control system shown in FIG. 6.

It should be pointed out that the control logic for controlling the control system 60 can vary. There are numerous control logic schemes that are appropriate for controlling the apparatus 10. Shown in FIG. 7, for example, is a control logic diagram for controlling the drainage control apparatus 10 for purposes of planting or harvesting. This is a control logic program that is based on projected dates for planting and harvesting and may be particularly related to one or more particular crops. This programmed logic also controls the drainage control apparatus 10 during the fallow period.

Discussed below is another one exemplary control logic scheme that may be employed. In this regard, the control system 60 continuously or periodically queries each sensor 62, 64 and 66. In one exemplary embodiment, the soil moisture sensor 62 is queried first, followed by the field water table level sensor 64 and that followed by a query of the ditch water level sensor 66. If the soil moisture sensor indicates that irrigation is required, this indicates that the soil moisture is below a preset threshold. Thereafter, the system will check the drainage ditch water level. If the water level in the drainage ditch is within or above a preset threshold, no action is taken. If the water level in the drainage ditch is below the preset threshold, the system will start irrigation, which in turn will cause the irrigation source to pump water into the drainage ditch. The control system queries the drainage ditch water level last because this indicates to the system if there is available capacity in the ditch to add water without it draining over the top of the weir plate 11 and leaving the system as drainage. Once irrigation is initiated, irrigation will continue until the ditch water level sensor 66 indicates that the water level in the drainage ditch has reached a pre-selected level. Once the water level in the drainage ditch reaches the pre-selected or threshold level, the controller 34 will shut down the irrigation system.

If the moisture sensor 62 determines that the moisture level in the root zone is above the preset threshold, this indicates that drainage is needed. The system will then check the drainage ditch water level. If the water level in the drainage ditch is within or below the preset threshold, no action will be taken. If the water level in the drainage ditch is above the preset threshold, the system would start drainage. That is, the system will actuate the apparatus 10 and the gate 14 will be open to drain the drainage ditch. The system checks the drainage ditch level last because this tells the system if the excess water in the field can be used to replenish the water stored in the drainage ditch. Once it is determined that the water level in the drainage ditch is at or below the preset threshold, then the gate 14 is closed and this stops the flow of water through the apparatus 10.

If the soil moisture is found to be within preset limits, the system will then query the water table level sensor 64. This query is the same as described above but initiated by the water table sensor 64. After the water table check is completed and the water table in the field is determined to be within selected limits, the system will start a new query checking the water level in the drainage ditch.

Three sensors, sensors 62, 64 and 66, are useful because the soil moisture in the root zone is considered, in one embodiment, the most important parameter for purposes of irrigation. However, relying only on that in a subsurface irrigation system is not always the correct approach. If there is a rainfall that is enough to cause the soil moisture sensor to be within an acceptable range, but the water table in the field is low, irrigation water will still need to be added. Also, the preset thresholds for the water level in the drainage ditch are different if the system is triggered off the soil moisture sensor 62 or the water table sensor 64. In these two cases, the water level in the drainage ditch will not be allowed to drop as low as when both are within the preset thresholds. This is particularly important if the water table begins to drop due to drought. The system should keep the drainage ditch as high as possible at all times to make sure that the water table does not drop below a point that it cannot recover. If the water table and soil moisture are both within the preset thresholds, the water level in the ditch can drop lower before triggering irrigation in anticipation of more rainfall. This reduces water use and pumping costs.

The present invention can be provided in various versions. For example, the system 10 may be embodied in a fully manual embodiment. This is where the gates or gate valves 14 are solely controlled manually. There may also be an electronic but manual control version of the present invention. Here, the electronic manual control version is the same as discussed above without an electronic controller. The gate valve 14 is operated mechanically or electrically by an operator simply actuating the same. Then, as discussed above, there is the fully automated version wherein the controller is pre-programmed or programmed from time-to-time by the farmer.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A control system for controlling moisture conditions in a field adjacent a drainage ditch comprising:
   a drainage control apparatus configured to be disposed in the drainage ditch and including:
   (1) a weir having a drainage opening;
   (2) a gate moveably mounted adjacent the drainage opening for opening and closing the drainage opening;
   (3) an actuator for moving the gate between open and closed positions;
   (4) a controller operatively connected to the actuator for controlling the actuator and the movement of the gate;

(5) the controller including inputs for receiving signals representative of the water table level in the field and signals representative of the water level in the ditch; and (6) wherein the controller is configured to control the actuator and the movement of the gate based on the signals representative of the water table level in the field or the signals representative of the water level in the drainage ditch.

2. The control system of claim 1 wherein the controller is configured to control the actuator and the movement of the gate based on the signals representative of the water table in the field and the signals representative of the water level in the drainage ditch, and wherein the controller is operatively connected to an irrigation source and is programmed to actuate the irrigation source and cause water to be pumped into the drainage ditch in response to the water table in the field being above or below a selected threshold and/or the water level in the drainage ditch being above or below a selected threshold.

3. The control system of claim 1 wherein the drainage control apparatus includes a battery for powering the actuator and a solar collector for charging the battery.

4. The control system of claim 1 further including a water table sensor adapted to be disposed in the field and operatively connected to an input of the controller for generating signals representative of the water table in the field; and a ditch water level sensor disposed in the ditch and operatively connected to an input of the controller for generating signals that are representative of the water level in the ditch.

5. The control system of claim 1 further including a soil moisture sensor adapted to be disposed in the field and operatively connected to an input of the controller for generating signals that are representative of soil moisture content in the field.

6. The control system of claim 1 wherein the controller is programmed with dates and the controller controls the water table level in the field based on the programmed dates.

7. The control system of claim 1 further including a water table sensor for sensing the water table in the field; a ditch water level sensor for sensing the water level in the drainage ditch; wherein the sensors are operatively connected to inputs of the controller for directing signals from the sensors to the controller; wherein the controller is operatively connected to an irrigation source and programmed to actuate the irrigation source and cause water to be pumped into the drainage ditch in response to the water table in the field being above or below a selected threshold and/or the water level in the drainage ditch being above or below a selected threshold.

8. The control system of claim 1 wherein the drainage control apparatus includes a battery for powering the actuator and a solar collector for charging the battery.

* * * * *